United States Patent
Jokisch

(10) Patent No.: US 7,762,753 B2
(45) Date of Patent: Jul. 27, 2010

(54) SELF-PIERCING ROTATIONALLY SYMMETRICAL RIVET

(75) Inventor: Matthias Jokisch, Langenhagen (DE)

(73) Assignee: ACUMENT GmbH & Co. oHG (DE)

( * ) Notice: Subject to any disclaimer, the term of this patent is extended or adjusted under 35 U.S.C. 154(b) by 139 days.

(21) Appl. No.: 11/995,980

(22) PCT Filed: Aug. 2, 2006

(86) PCT No.: PCT/DE2006/001341

§ 371 (c)(1),
(2), (4) Date: Jan. 29, 2008

(87) PCT Pub. No.: WO2007/016901

PCT Pub. Date: Feb. 15, 2007

(65) Prior Publication Data

US 2008/0232930 A1    Sep. 25, 2008

(30) Foreign Application Priority Data

Aug. 9, 2005    (DE) ............... 20 2005 012 677 U

(51) Int. Cl.
*F16B 19/08* (2006.01)
(52) U.S. Cl. .................... 411/501; 411/179
(58) Field of Classification Search ............ 411/179, 411/501; 29/432.2, 798
See application file for complete search history.

(56) References Cited

U.S. PATENT DOCUMENTS

| | | | |
|---|---|---|---|
| 5,738,475 A * | 4/1998 | Chaban | 411/501 |
| 6,325,584 B1 * | 12/2001 | Marko et al. | 411/501 |
| 6,662,911 B1 | 12/2003 | Nugier | |
| 6,663,329 B2 * | 12/2003 | Singh et al. | 411/501 |
| 6,988,862 B1 * | 1/2006 | Iguchi et al. | 411/501 |
| 2002/0006321 A1 | 1/2002 | Singh et al. | |

FOREIGN PATENT DOCUMENTS

| | | |
|---|---|---|
| DE | 44 31 769 | 3/1996 |
| DE | 200 01 103 | 4/2000 |
| EP | 0 720 965 | 7/1996 |
| EP | 0 833 063 | 4/1998 |
| EP | 1 229 254 | 8/2002 |
| EP | 1 387 093 | 2/2004 |
| TW | 325838 | 1/1998 |
| TW | M246490 | 10/2004 |
| TW | 1233470 | 6/2005 |

OTHER PUBLICATIONS

English translation of the International Preliminary Report on Patentability; Five (5) pages.

* cited by examiner

*Primary Examiner*—Gary Estremsky
(74) *Attorney, Agent, or Firm*—Trexler, Bushnell, Giangiorgi, Blackstone & Marr, Ltd.

(57) ABSTRACT

Rotationally symmetric self-pierce rivet (10) having a rivet head (14) and a rivet shank (12) provided with a centrical recess (16) closed by the rivet head (14), wherein the rivet shank (12) is having an outer contour which generally is following the course of an ellipse (18) externally lined up against the rivet shank the major axis (A) thereof basically extending parallel to the axis of the rivet (10).

6 Claims, 13 Drawing Sheets

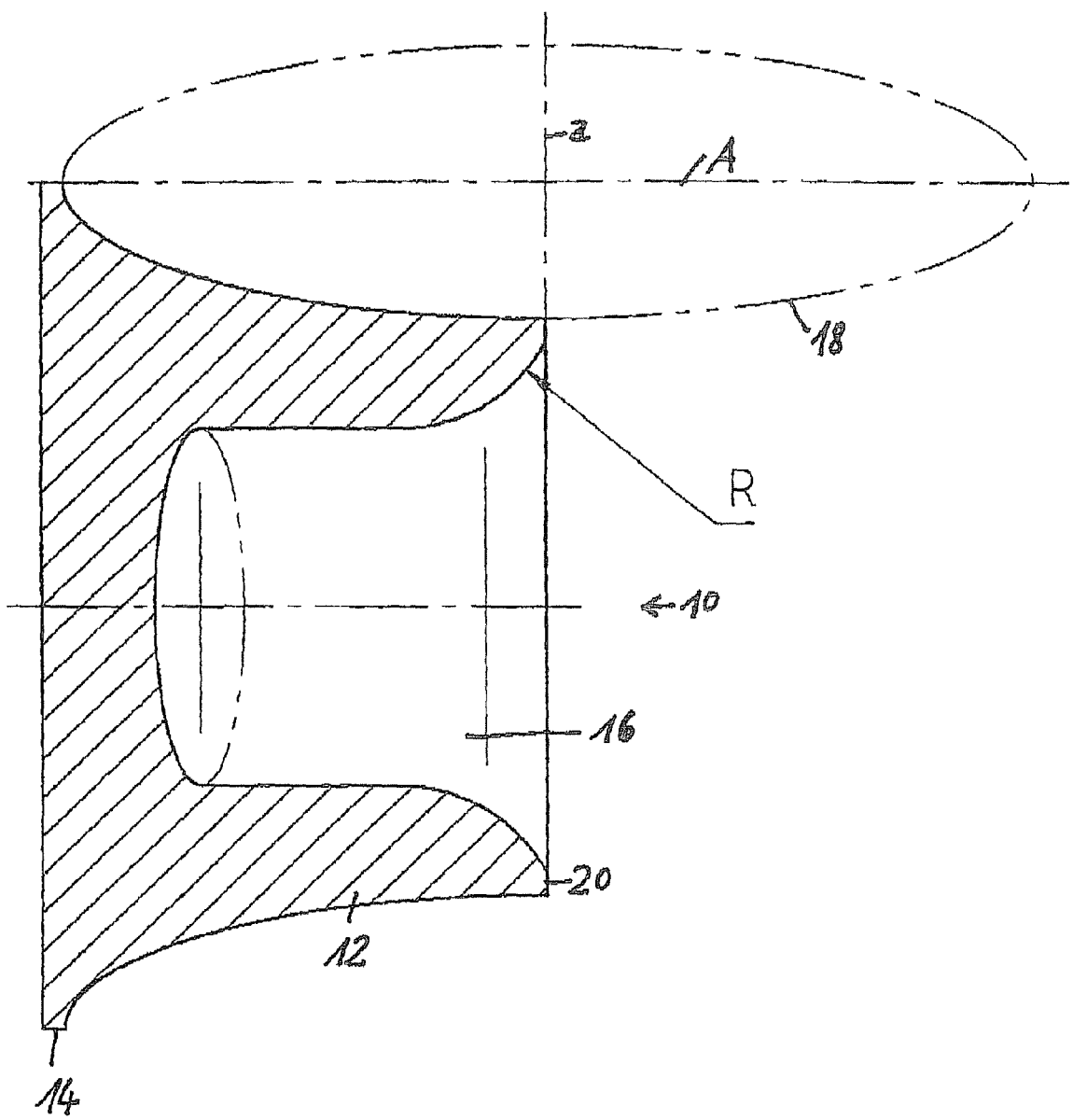

SELF-PIERCING ROTATIONALLY SYMMETRICAL RIVET

RELATED/PRIORITY APPLICATION

Figure 1:
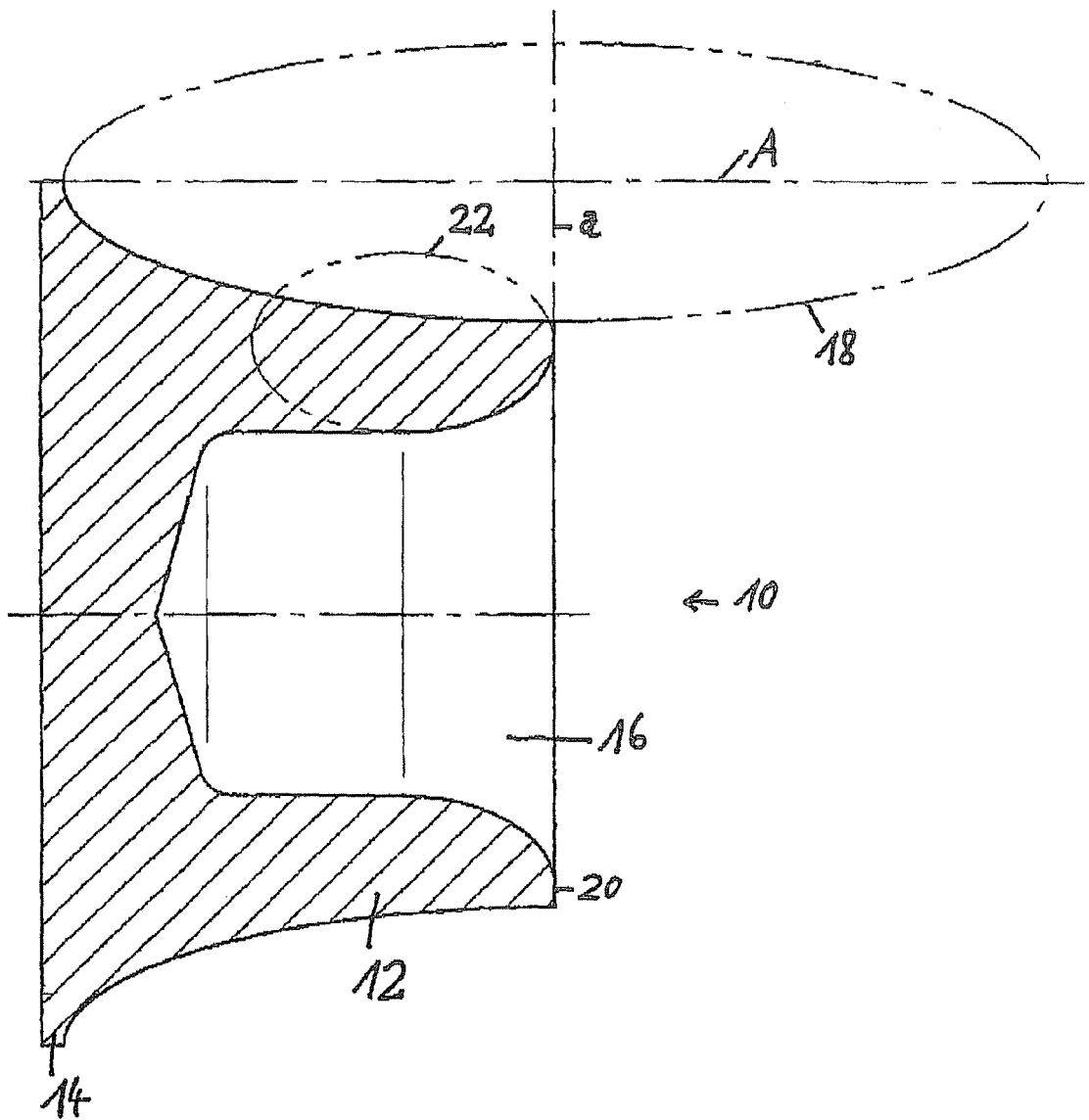

This application is a National Phase filing regarding International Application No. PCT/DE2006/001341, filed on Aug. 2, 2006. International Application No. PCT/DE2006/001341 relies upon German Application No. 20 2005 012 677.2, filed on Aug. 9, 2005, for priority.

The present invention relates to a rotationally symmetric self-pierce rivet having a rivet head and a rivet shank provided with a centric recess closed by the rivet head.

Such fasteners which are referred to as "pierce rivets" for example are known from the EP 720 965, the EP 833 063, the EP 1 229 254, and the DE 44 31 769. These usually are consisting of a shank basically formed as a hollow cylinder being open on the side of the workpiece which via radii is changing into a disk-shaped head.

The pierce rivets according to the prior art in any case in the area of the shank always have a cylindrical contour.

In the meantime, these pierce rivets became the usual prior art. In the industry working with metal sheet, especially the automotive industry, more and more high-strength steels are used. Pierce rivets according to the prior art then cannot be used anymore since they are deformed or swaged before the piercing is achieved.

To solve this problem, it already has been proposed to produce the pierce rivets according to the prior art, too, from a metal having a higher strength. This however did not lead to the desired success since then during the placing the danger of cracks increases.

Further, the automotive industry desired a pierce rivet which could be placed such that after the placing no gap between the rivet and the workpiece, into which the rivet had been placed, is allowed since only in this way a corrosion resistance of the pierce rivet connection can be achieved.

Starting out from this situation, it is therefore the task to be solved by the present invention to improve such a pierce rivet in such a way that it can be placed in sheets of high-strength steel without it being necessary to chose especially hard materials for the pierce rivet, wherein simultaneously the formation of a gap between the rivet and the workpiece after the placing is to be excluded.

According to the invention, this task is solved by the features that the shank of the rivet of the pierce rivet is having an outer contour which generally is following the course of an ellipse lined up against the shank of the rivet the major axis thereof basically extending parallel to the axis of the rivet.

According to the invention therefore for the first time it is deviated from the cylindrical outer contour of the shank of the pierce rivet which until now was taken for being indispensable because of the necessary piercing properties. By way of the higher shank wall thickness in the upper region of the shank the same can transfer higher loads during the piercing and therefore the pierce rivet according to the invention can be placed in sheets of high strength steel and stainless steel without the rivet shank collapsing or swaging during the placing. The design of the rivet shank according to the invention in an advantageous way additionally is preventing the formation of gaps between the pierce rivet and the material of the workpiece.

To facilitate the production of the outer contour of the rivet shank, the course thereof can be approximated by chord sections of the ellipse lined up against from the exterior.

Preferably in this connection the rivet head is formed as a very flat cylinder.

An especially advantageous shape is achieved if the height of the rivet shank is corresponding to the half of the length of the major axis of the ellipse.

Further it is preferred if the difference of the outer radii of the rivet shank at the shank side and at the head side end is corresponding to the half of the length of the minor axis of the ellipse.

Especially it is preferred that the recess in the shank on the head side is tapering off in the shape of a cone.

The recess however at the head side can follow the course of a further ellipse having a horizontally positioned major axis.

According to a further preferred embodiment of the invention, the transition of the outer contour of the shaft of the rivet at the shaft side end of the rivet to the inner contour limiting the recess is formed by a very small radius on the exterior and a very large radius at the interior.

Further it is preferred if the outer contour of the shaft of the rivet at the shaft side end of the rivet approximately is changing in an right angle into an annular surface which in a large radius is changing into the inner contour limiting the recess.

Further it is preferred, too, that the outer contour of the shaft of the rivet at the shaft side end of the rivet approximately in an right angle is changing into an annular surface and that the shaft side part of the inner contour limiting the recess generally is following the course of a smaller ellipse being partly inscribed in the shank the major axis thereof extending generally parallel to the axis of the rivet.

A further preferred embodiment of the invention is consisting in that the outer contour of the shank of the rivet on the shank side end of the rivet in an acute angle is changing into a bevel which already is forming the inner contour of the recess such that the recess is consisting of a truncated cone tapering off in the direction of the rivet head which on the head side is changing into a cylindrical section.

Further it is preferred that the outer contour of the shank of the rivet at the shank side end of the rivet is changing with a small radius into the inner contour limiting the recess and which at its shank side part basically is following the course of a smaller ellipse being inscribed into the shaft at least partly the major axis thereof generally extending parallel to the axis of the rivet.

Exemplary embodiments of the present invention, in the following, more detailly are described with reference to the enclosed drawings. In the drawings show:

FIG. 1 a pierce rivet according to the invention in a cross-sectional view parallel to the axis of rotation and FIGS. 2 to 13 similar cross-sectional views of modified pierce rivets according to the invention.

FIG. 1 is showing a first embodiment of a pierce rivet 10 according to the invention having a shank 12 and a head 14, wherein the shank 12 is enclosing a recess 16 which in the direction of the head 14 is closed and there is ending in a flat cone shape.

The outer contour of the shank 12 here is formed by a ellipse 18, the major axis A of which is positioned parallel to the rotational axis of the rivet 10 and the length of which is the double of the length of the shank 12 such that the outer contour is formed by a quarter, i.e. a quadrant of the ellipse 18. The length of the minor axis a of the ellipse here is corresponding the double of the difference of the outer radii of the rivet shank 12 at the shank side and at the head side end.

The outer contour of the rivet shank 12 at the shank side end almost in an right angle is changing into a narrow annular surface 20. The narrow annular surface 20 thereafter tangentially is changing into the inner contour of the shank 12 which simultaneously is forming the limit of the recess 16. The course of the inner contour here is following the course of a further ellipse 22 which partly is inscribed into the cross-section of the shank 12, the major axis of which being positioned parallel to the rotational axis of the rivet 10. As soon as the course of the ellipse 20 is parallel to the rotational axis of the rivet 10, this course tangentially is changing into a cylindrical section of the recess 16 which on the head side via a radius is leading into the flat cone shaped end of the recess 16.

Figure 2:
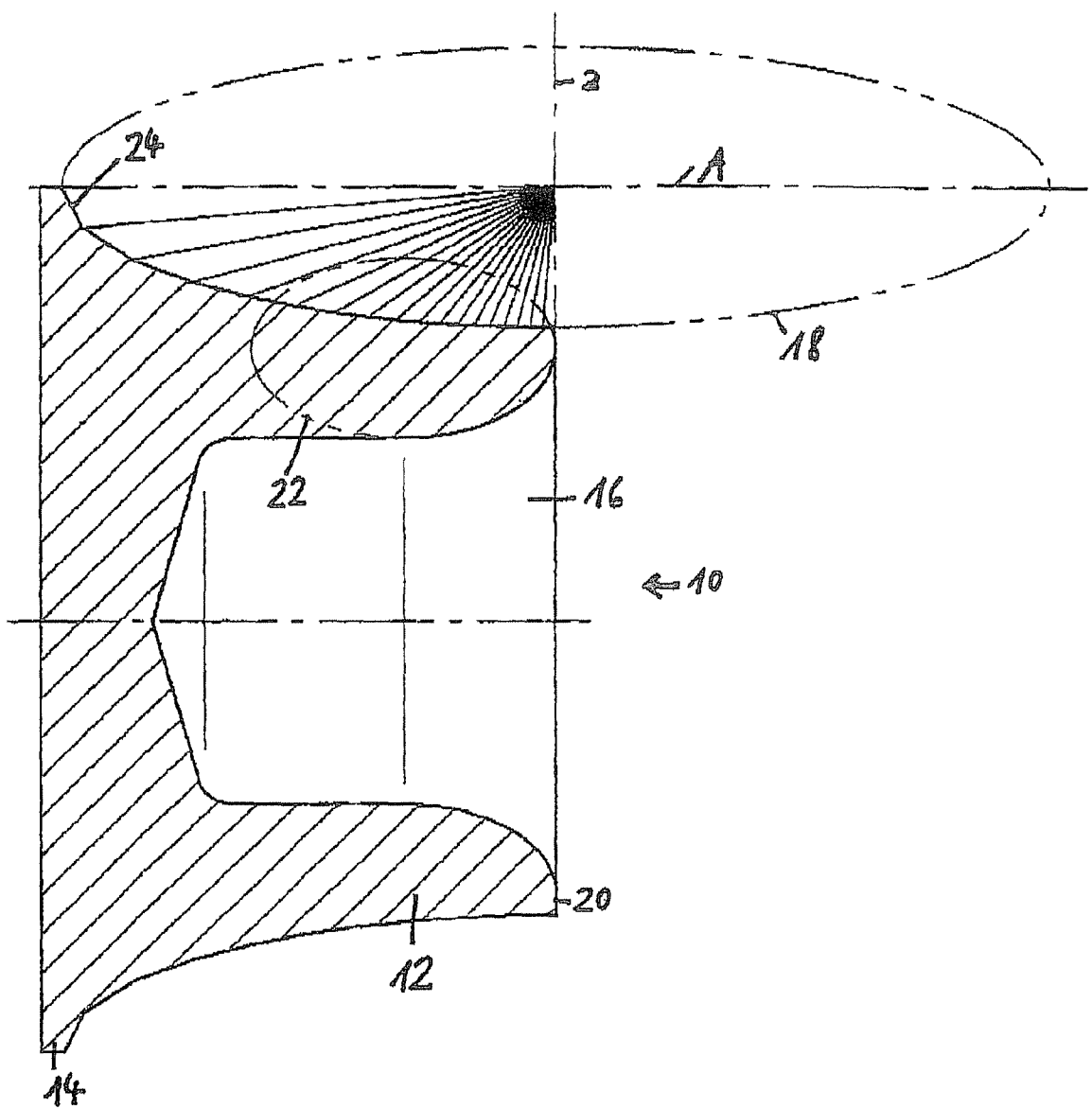

FIG. 2 is showing a similar embodiment of the pierce rivet 10 according to the invention. In this embodiment however the course of the ellipse 18 is approximated by discrete chord sections, whereby the production of the pierce rivet according to the invention can be facilitated. The geometric developments of the chords of secant elements 24 is shown by the representation of the respective radii of the ellipse.

Figure 3:
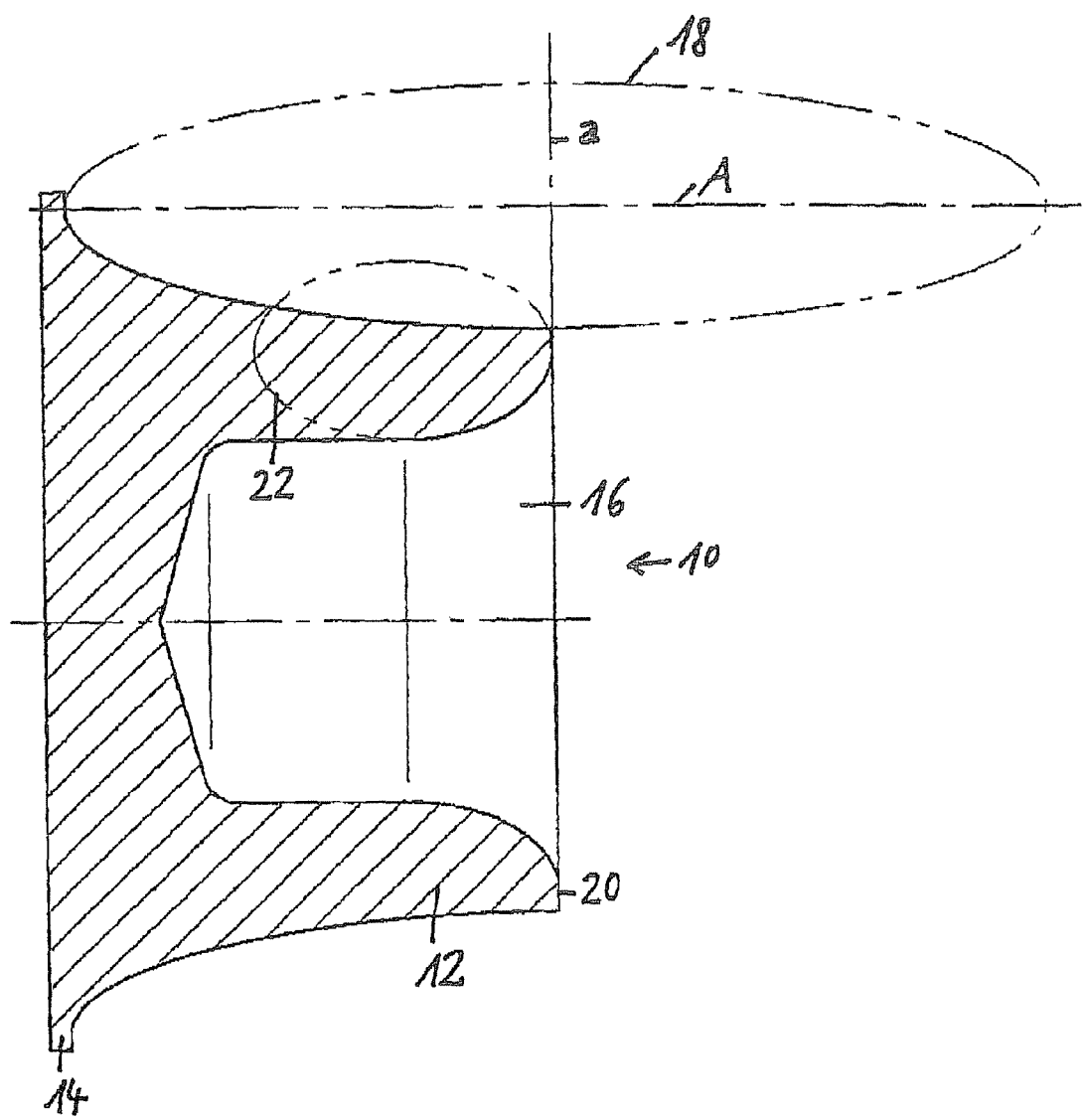
Figure 4:
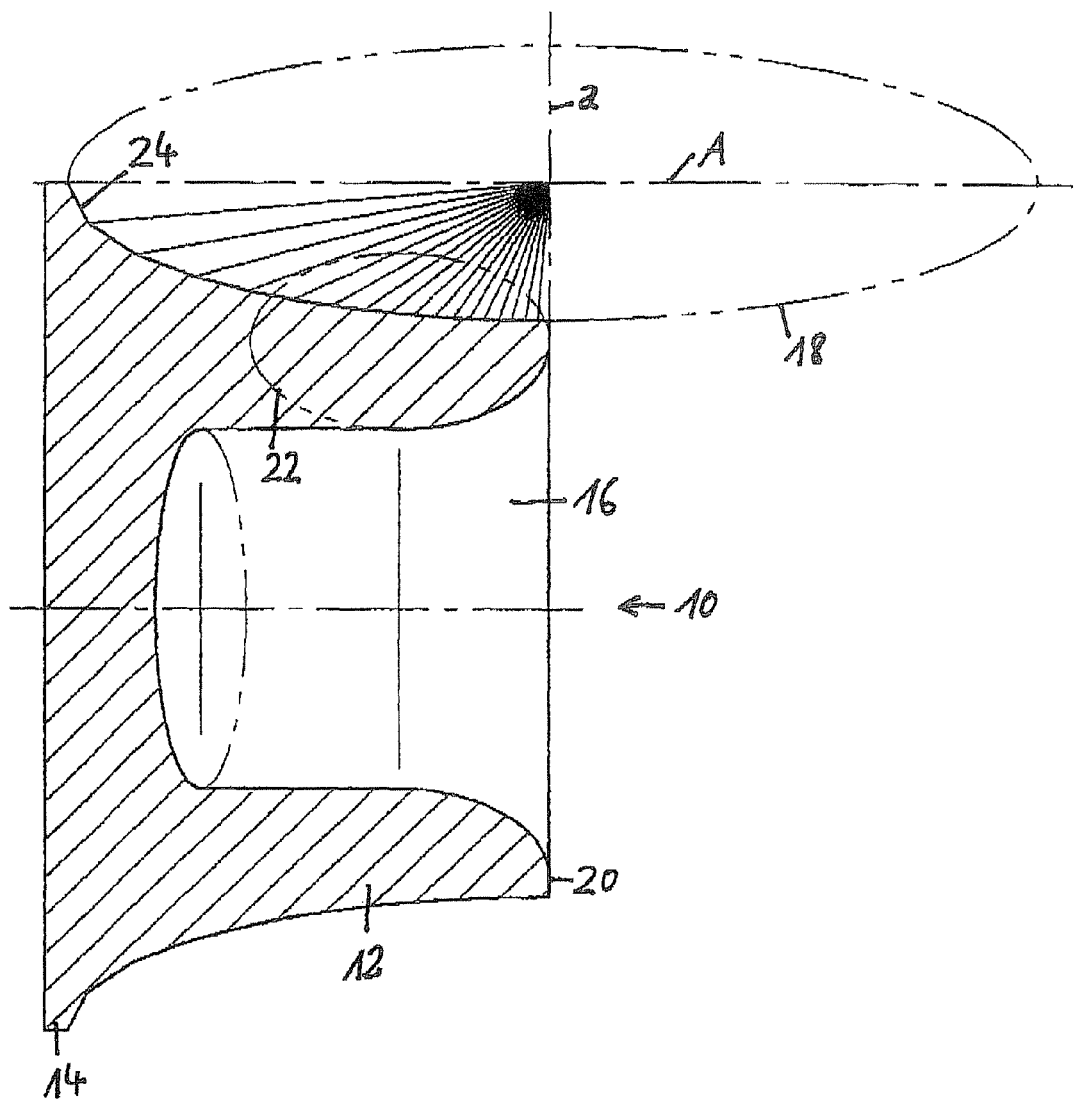

FIG. 3 is showing a further modification of the pierce rivet according to FIG. 1, wherein the rivet head 14 is enlarged such it is projecting beyond the major axis A of the ellipse 18.

FIG. 4 again is showing a modification of the pierce rivet according to FIG. 2 in which the recess 16 at the head side is closed by a dome instead of a cone-shaped end which cross-sectional view is following the course of a third ellipse, the major axis of which is horizontal and the length of which is corresponding to the diameter of the recess 16.

Figure 5:
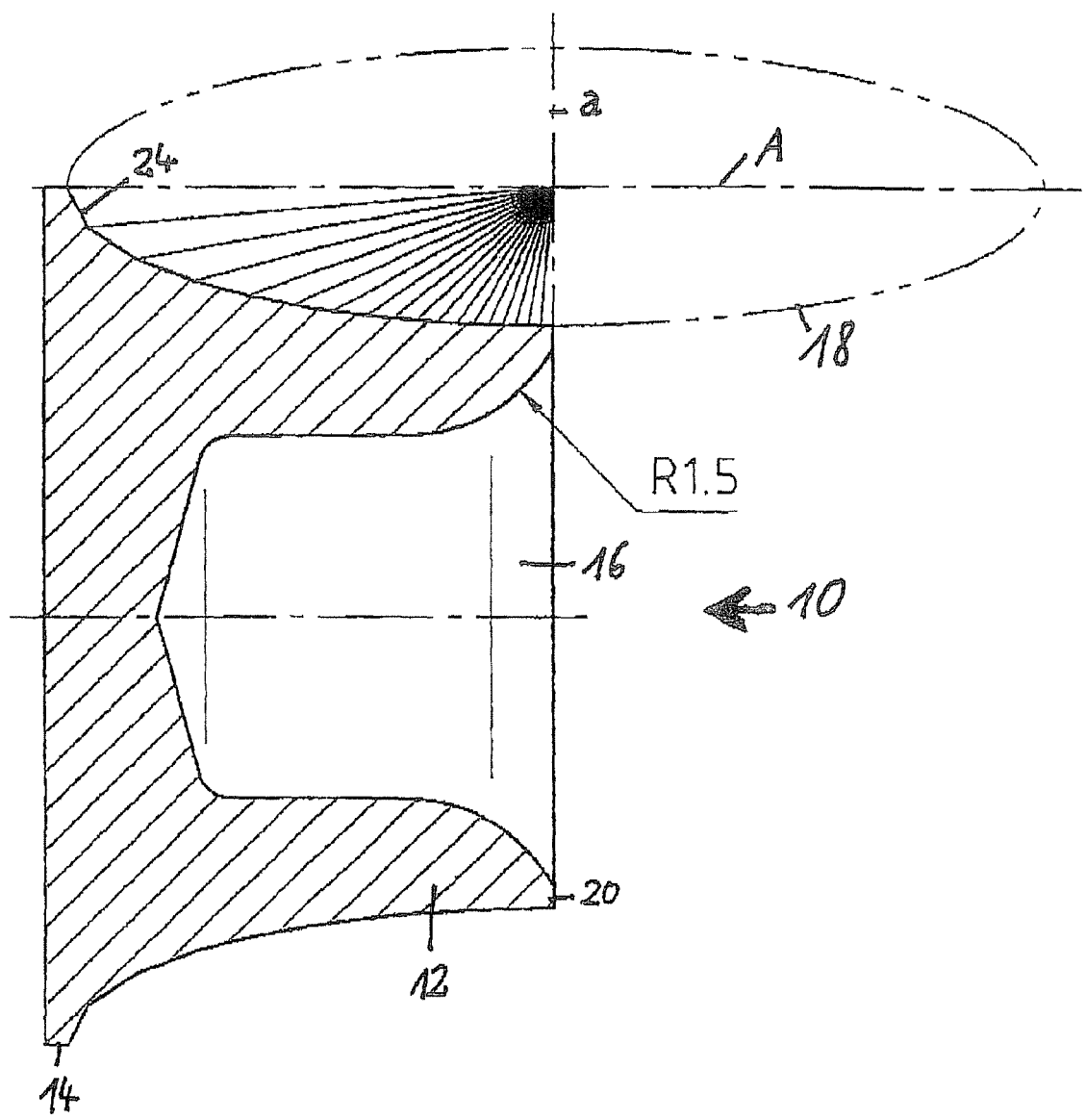
Figure 6:
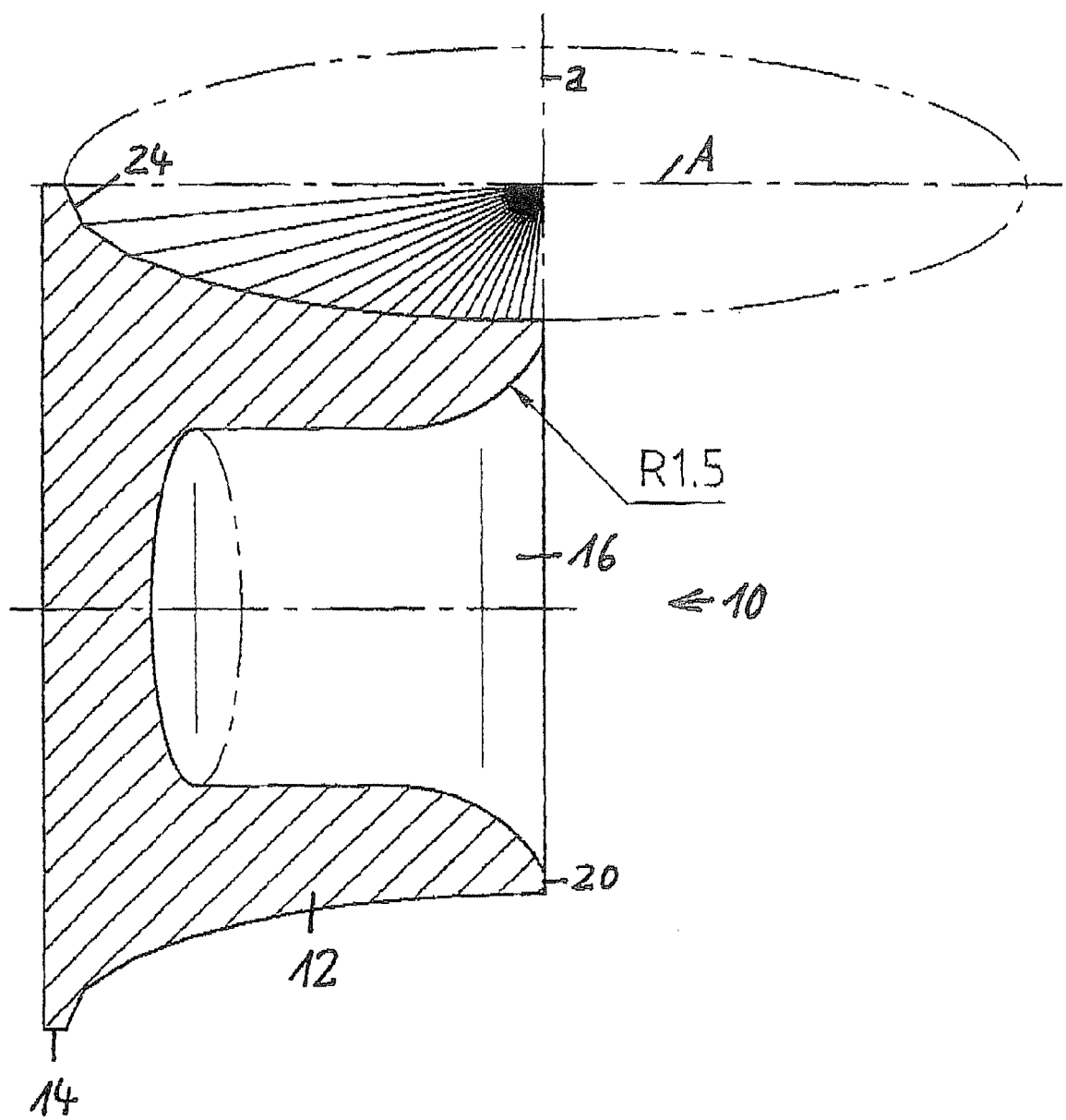
Figure 7:
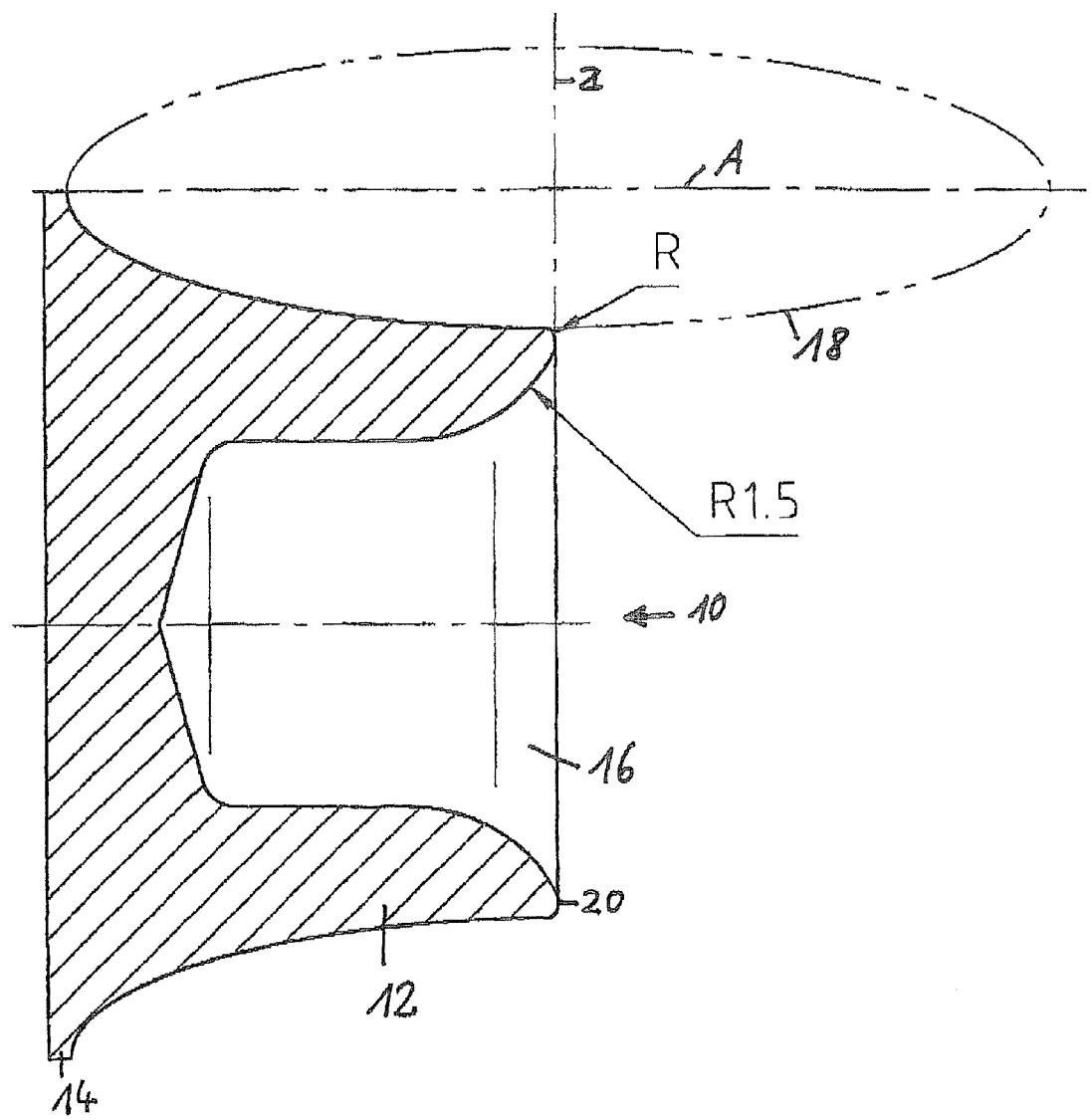

FIG. 5 is showing a further modification of the embodiment according to FIG. 2 in which the inner contour of the recess 16 beyond the annular surface 20 is not following the course of a further ellipse but instead of a radius R 1.5.

FIG. 6 again is showing a further modification of the embodiment of the pierce rivet according to FIG. 5 in which the flat cone-shaped head side end of the recess 16 is substituted by a dome, the cross-section of which generally is following the course of a further ellipse having a horizontally positioned major axis.

FIG. 7 again is showing a modification of FIG. 1 in which the outer contour via a very small radius R and not with an almost right angle is changing into the annular surface 20. In the further course, the inner contour 16 here not is following an ellipse but instead a large radius R 1.5.

Figure 8:
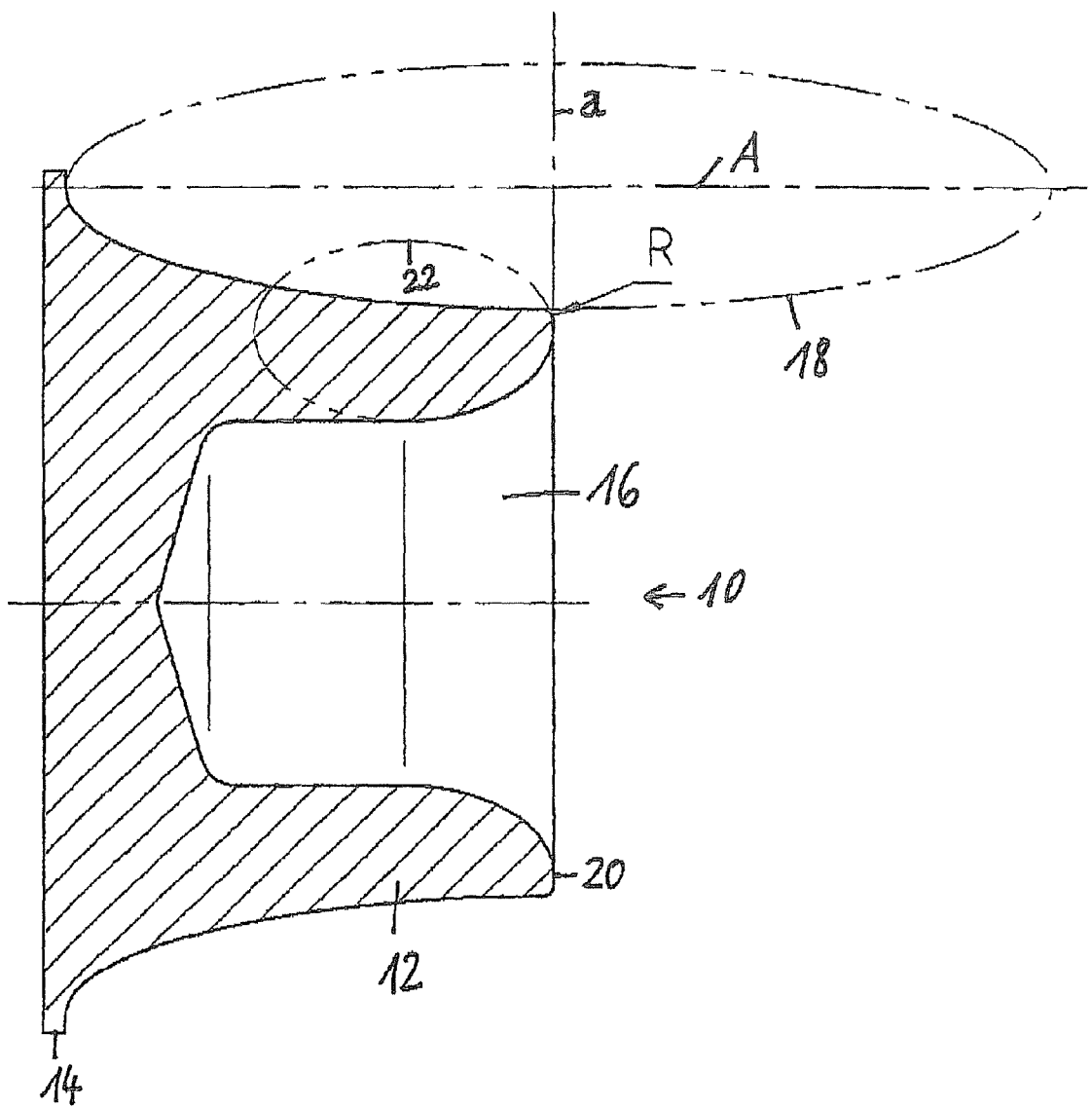
Figure 9:
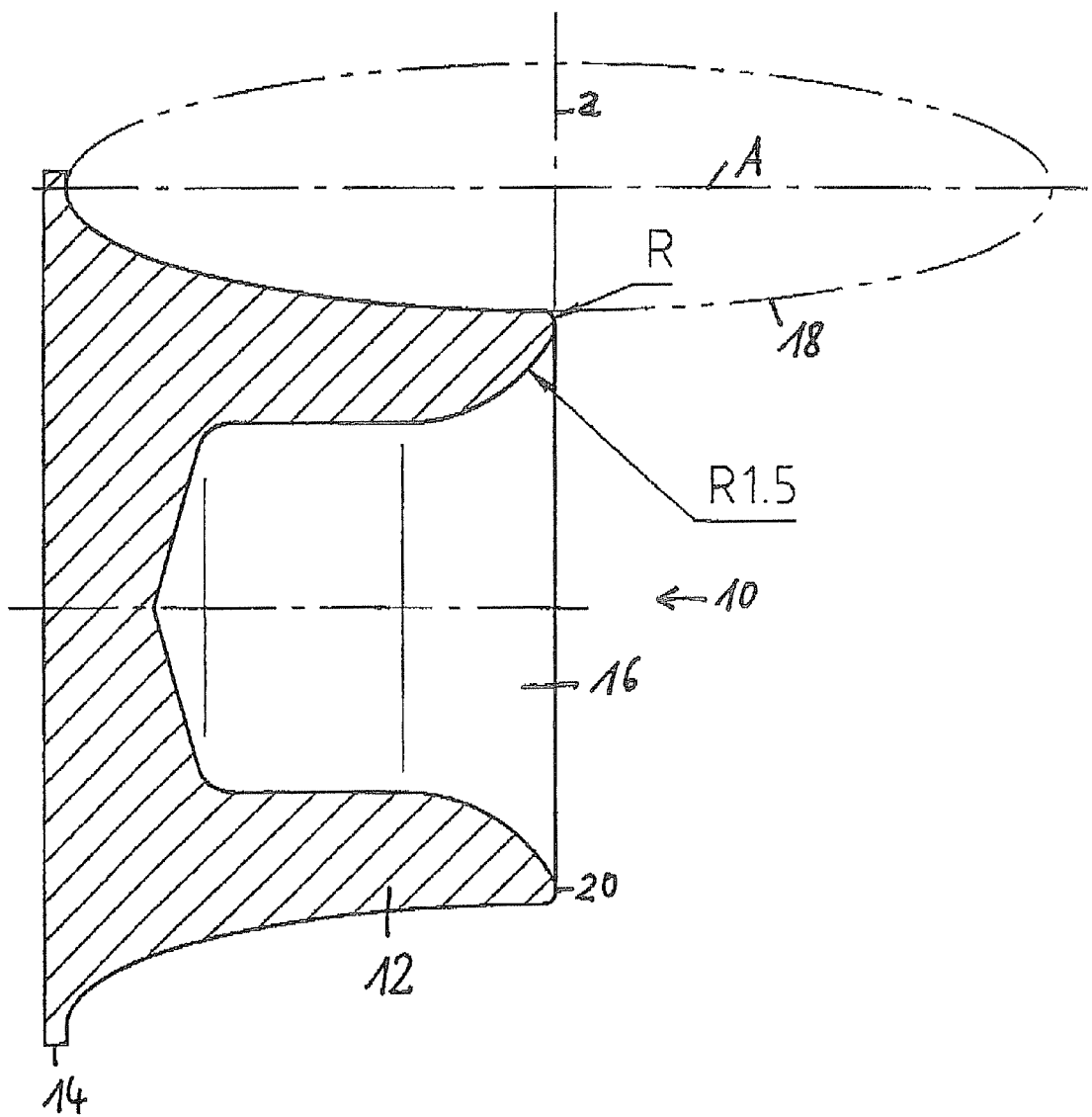

FIG. 8 shows a modification of the embodiment according to FIG. 3 in which the transition between the outer contour and the shank side annular surface not almost at an right angle but instead is following a very small radius R.

FIG. 9 again shows a modification of FIG. 8 in which the shaft side course of the inner contour is not following an ellipse but instead a large radius R 1.5.

Figure 10:
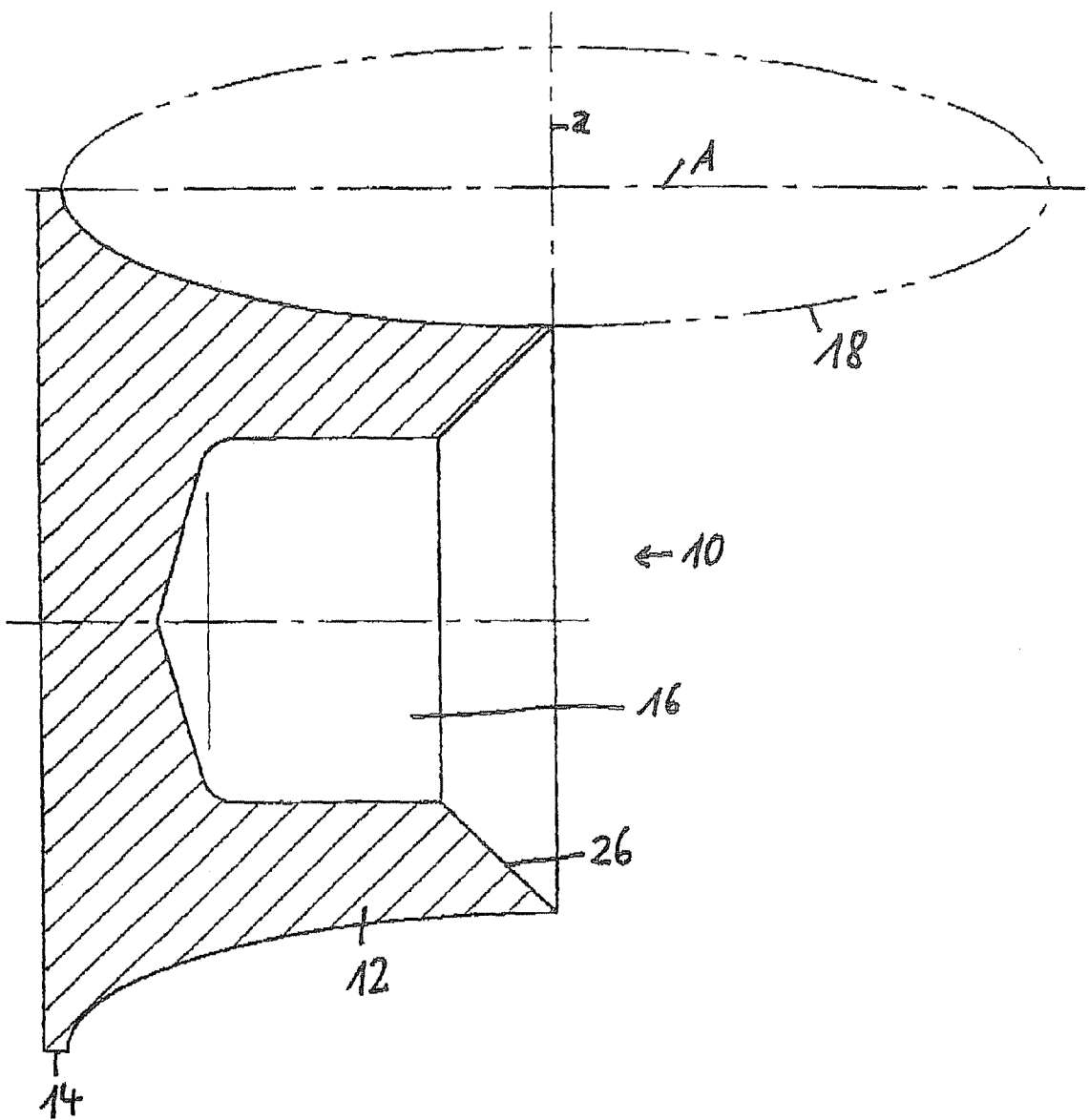

FIG. 10 is showing a further embodiment of a pierce rivet according to the invention in which the transition from the outer contour of the shank 12 to the inner contour is in an acute angle such that the outer contour and the inner contour directly are meeting in an angle distinctively smaller than 90°. The recess 16 then is limited by a bevel 26 which then is changing into the usual cylindrical shape of the recess 16 such that the recess 16 seen from the side of the shank firstly is in the shape of a truncated cone and thereafter cylindrical and finally is ending in a flat cone-shaped structure via a small radius.

Figure 11:
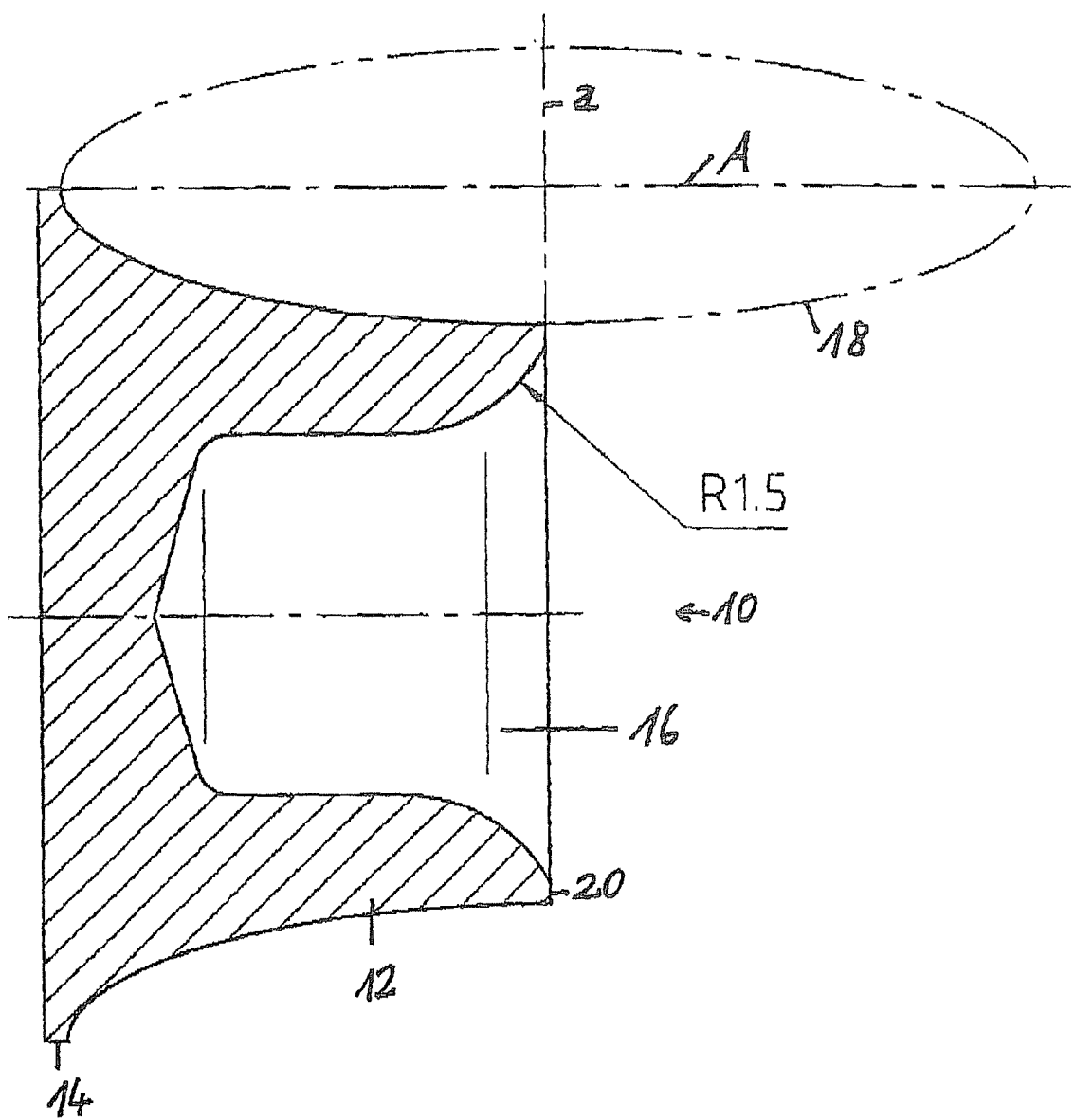

FIG. 11 is showing a further modification of FIG. 1 in which the shank side course of the inner contour is not following an ellipse but instead a large radius R. 1.5.

Figure 12:
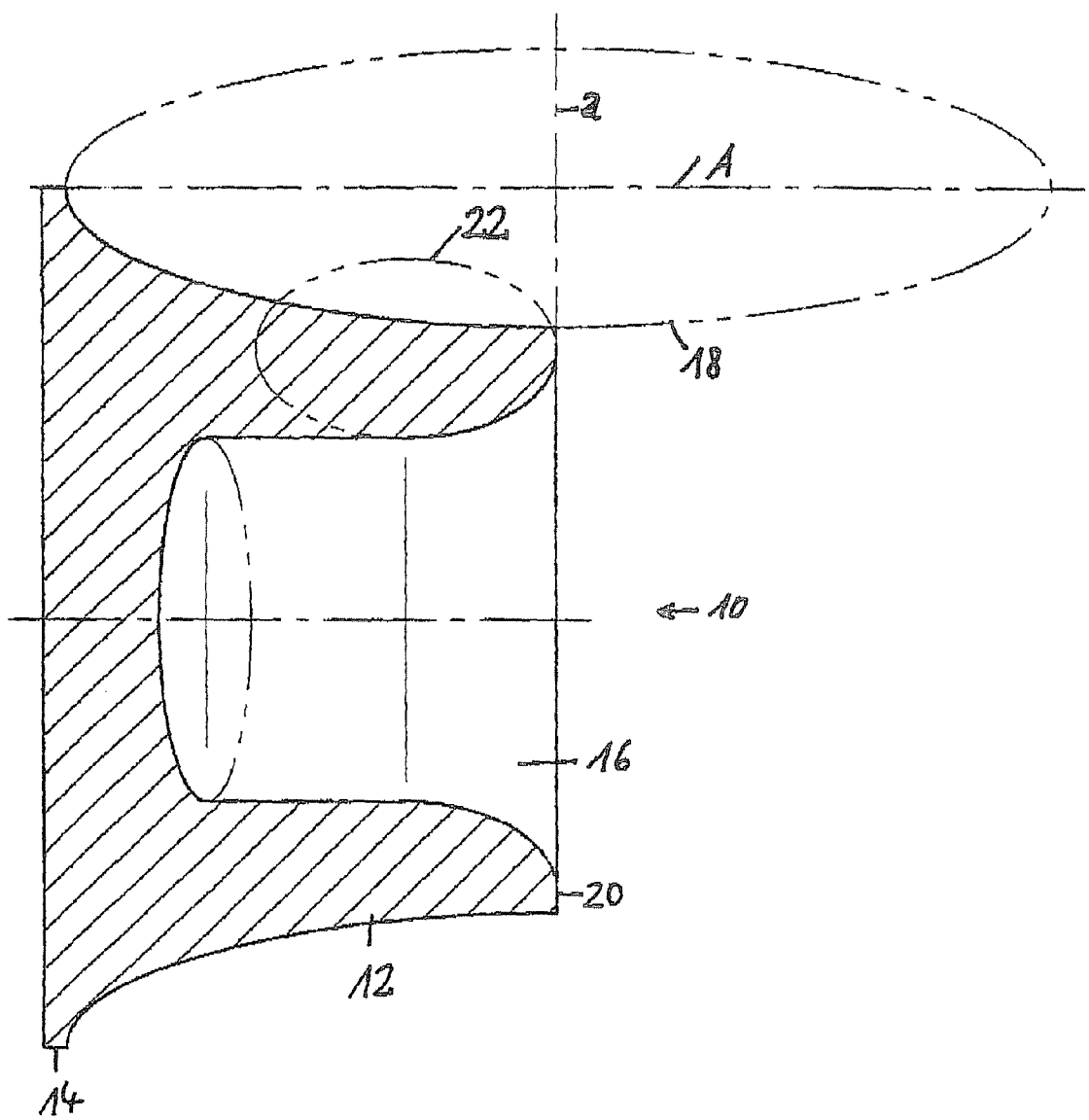

FIG. 12 finally is showing a further modification of FIG. 1 in which the recess 16 is not ending in a flat cone but instead in a wide dome, the cross-section of which basically is following the shape of a lying ellipse.

FIG. 13 again is showing a modification of FIG. 12 in which the shaft side part of the inner contour of the recess 16 is not following an ellipse but instead a wide radius R.

All above embodiments of the punch rivet according to the invention preferably can be produced from steel, stainless steel, aluminum or titanium.

The invention claimed is:

1. Rotationally symmetric self-pierce rivet comprising a rivet head and a rivet shank provided with a centrical recess closed by the rivet head wherein the rivet shank has an outer contour which follows the course of an ellipse lined up against the rivet shank, wherein a major axis thereof extends parallel to an axis of the rivet, wherein the outer contour of the shank of the rivet on a shank-side end of the rivet at a right angle changes into an annular surface and the shank-side part of an inner contour limiting the recess generally follows a course of a smaller ellipse which is at least partly inscribed in the shank and the major axis thereof extends parallel to the axis of the rivet.

2. Rivet according to claim 1, characterised in that the rivet head is a flat cylinder.

3. Rivet according to claim 1, characterised in that the height of the rivet shank corresponds to half of a length of the major axis of the ellipse.

4. Rivet according to claim 1, characterised in that a difference of an exterior radius of the rivet shank at the shank-side end and head-side end corresponds to the half of a length of the minor axis of the ellipse.

5. Rivet according to claim 1, characterised in that the recess on the head side is tapered in the shape of a cone.

6. Rivet according to claim 1, characterised in that the rivet is produced from steel, stainless steel, aluminum or titanium.

* * * * *